(No Model.)

2 Sheets—Sheet 1.

C. E. CONRAD.
SPRING MOTOR.

No. 422,071.

Patented Feb. 25, 1890

Witnesses
Wm Musser.
A. G. Heylmun.

Inventor
Charles E. Conrad.
By his Attorneys
Hazy & Howes.

(No Model.) 2 Sheets—Sheet 2.

C. E. CONRAD.
SPRING MOTOR.

No. 422,071. Patented Feb. 25, 1890.

WITNESSES
Wm Musser
B. W. Sommers

INVENTOR
Charles E. Conrad.
by Haney & Howes,
Attorneys.

UNITED STATES PATENT OFFICE.

CHARLES EMANUEL CONRAD, OF HASTINGS, NEBRASKA.

SPRING-MOTOR.

SPECIFICATION forming part of Letters Patent No. 422,071, dated February 25, 1890.

Application filed July 20, 1889. Serial No. 318,098. (No model.)

*To all whom it may concern:*

Be it known that I, CHARLES EMANUEL CONRAD, a citizen of the United States, residing at Hastings, in the county of Adams and State of Nebraska, have invented certain new and useful Improvements in Spring-Motors; and I do hereby declare the following to be a full, clear, and exact description of the invention, such as will enable others skilled in the art to which it appertains to make and use the same.

My invention has relation to improvements in spring-motors and regulators for the same, and the object is to simplify and improve existing mechanisms of the kind.

I accomplish the objects of my invention by the mechanism illustrated in the accompanying drawings, wherein—

Figures 1, 2:
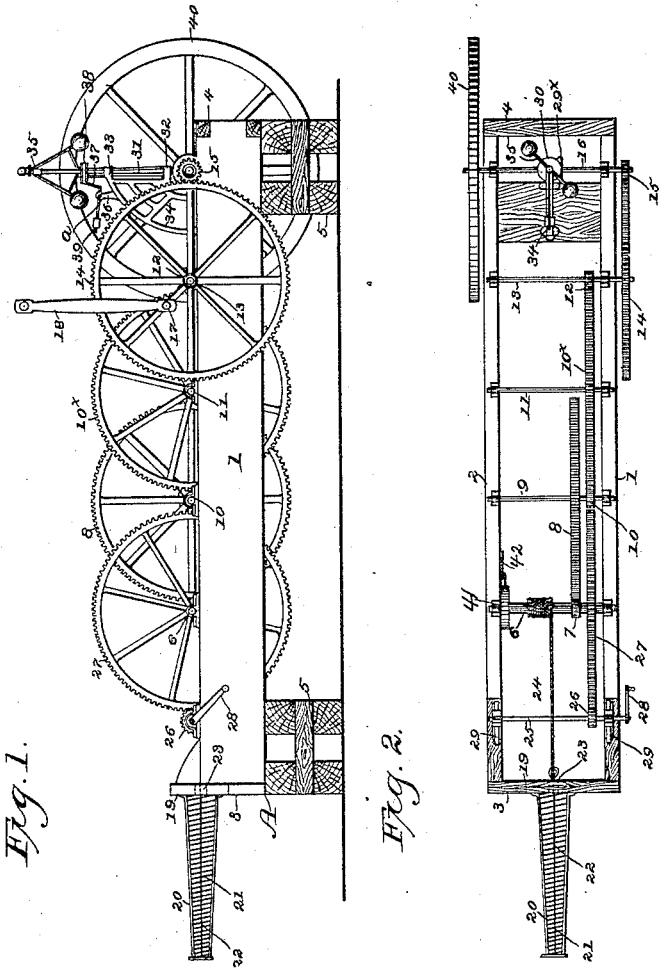
Figure 3:
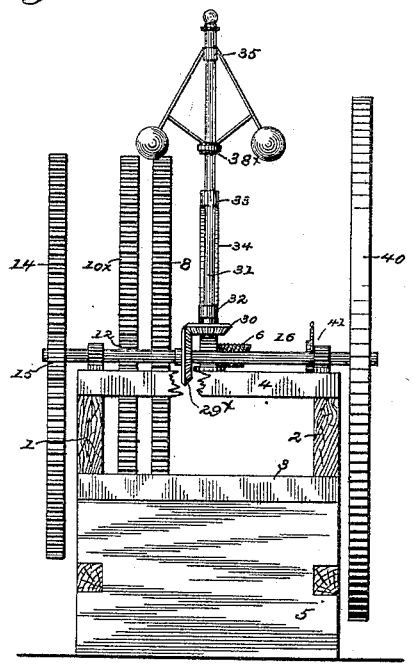
Figure 4:
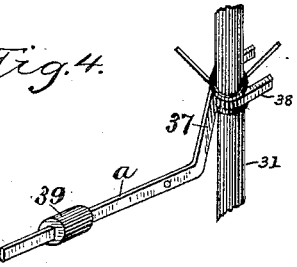

Figure 1 is a side elevation of the machine, and Fig. 2 is a plan view of the same. Fig. 3 is an end view showing the governor mechanism. Fig. 4 is a detail view of the adjusting-lever on the governor.

A designates the bed-frame of the machine, composed of substantial side pieces 1 2, connected at their ends by cross-pieces 3 4, the frame being mounted on suitable supports 5.

Mounted in suitable bearings on the frame is a drum-shaft 6, carrying a small gear-wheel 7, meshing with a large gear-wheel 8 on a shaft 9, mounted in bearings on the frame.

On the shaft 9 is a small gear-wheel 10, similar to the gear 7, which meshes with a large gear-wheel $10^\times$ on a shaft 11. The gear-wheel $10^\times$ in turn meshes with a small gear-wheel 12 on shaft 13, and on this shaft is a large gear-wheel 14, meshing with a small gear 15 on the shaft 16.

On one arm of the gear-wheel 14 is a wrist-pin 17, to which is attached a connecting-rod 18, by which connection is made to the object to be rotated or moved.

On the end of the frame is fixed a foot-piece 19, constituting a seat for the motor-spring, and on the outer face of this seat is fixed a chamber or housing 20, tapering outwardly from its base and terminating in a closed end large enough to take the end of the spring when extended to the length of the chamber. In this chamber is arranged the motor-spring 21, having its base-coil fixed to the foot-piece 19, and to the free end is attached a pull-rod 22, extended centrally through coils and through a slot or aperture 23 in the foot-piece, and having its end connected to the rope or cord 24, fastened on the drum-shaft, substantially as shown.

A shaft 25 is mounted in bearing-boxes 29, carrying a small gear 26, meshing with a gear 27 on the drum-shaft 6, and on the shaft 25 is a crank-arm 28. The bearing-boxes 29 of shaft 25 may be made to slide, in order that the engagement of the gears 26 and 27 may be disconnected and engaged at will. This gearing serves to wind the cord and compress the spring ready to exert its force on the connected mechanism.

On the shaft 16 is a bevel-gear $29^\times$, which meshes with a similar gear 30 on the end of the vertical shaft 31, to which the governor is connected. The vertical shaft 31 is held in bearings 32 33, projected from a bracket 34 on a support arranged across the bed of the machine.

To the upper portion of the vertical shaft is suspended the governor 35, consisting of two arms pivotally hung to a collar on the vertical shaft having the usual weights on their free ends, and connected by pivoted rods connected to a sliding collar $38^\times$ on the shaft.

On the bracket 34 is a standard 36, in which is fulcrumed a lever $a$, having one arm 37 formed with a fork 38, arranged about the shaft and under the sliding collar of the governor, and on the other arm of the lever is a weight 39, made adjustable thereon to regulate the limit of depression of the governor-arms, the governor serving to equalize the speed in conjunction with the fly-wheel 40, mounted on the shaft 16.

The operation is readily perceived by reference to the drawings in connection with the foregoing description of the mechanism. The spring being compressed, on being released it exerts its force in the opposite direction, turning the drum-shaft through its connection with the cord, and from thence communicating motion to the train of gears, the speed being equalized and maintained by the agencies of the governor and fly-wheel. The proper connection being made to the object through the connecting-rod, an even and uniform motion is communicated thereto.

A brake-wheel 41 is fixed on the shaft 6, to stop the movement when required. Around the wheel 41 is a strap or belt connected to a lever 42, pivoted to the side piece 2 of the frame, and adapted to bind the strap or belt around the drum.

Having thus described my invention, what I claim, and desire to secure by Letters Patent, is—

1. In a spring-motor, the combination of a supporting-frame, a housing for the motor-spring, consisting of a tapering shell secured to and projecting from the end of the frame, a spring in the housing, a drum-shaft connected to the free end of the spring, a train of gearing, and a governor on the last shaft of the train of gearing, substantially as described.

2. In a spring-motor, the combination of a supporting-frame, a housing for the motor-spring, consisting of a tapering shell secured to and projecting outwardly from the end of the frame, a spring in the housing, a pull-rod and cord connected to the free end of the spring, a drum-shaft having the pull-cord connected thereto, the shafts and gearing, substantially as shown, the bevel-gearing $29^\times$ and 30, the governor on the vertical shaft, the bracket 34 on the frame of the machine, and the regulating-lever $a$, having a weighted arm and forked end to engage the sliding collar of the governor, substantially as described, and for the purpose specified.

In testimony whereof I affix my signature in presence of two witnesses.

CHARLES EMANUEL CONRAD.

Witnesses:
A. M. WALTERS,
WM. A. WATKINS.